United States Patent Office 3,058,940
Patented Oct. 16, 1962

3,058,940
PREPARATION OF WATER-SOLUBLE POLY-ETHYLENE GLYCOL COPOLYMERS IN AQUEOUS MEDIUM
Richard W. Rees, Wilmington, Del., assignor to Shawinigan Chemicals Limited, Montreal, Quebec, Canada, a corporation of Canada
No Drawing. Filed May 22, 1959, Ser. No. 814,975
9 Claims. (Cl. 260—29.6)

This invention relates to new products prepared by polymerizing copolymerizable monomers with polyethylene glycols in aqueous solution, and to the processes for preparing said products.

It has previously been found that certain polymerizable monomers can be reacted with polyoxyethylene compounds to form copolymers which have useful properties. Those copolymers which are water soluble have been found to have surface active properties, i.e. to exert surface tension depressing effects; such copolymers, for example, can be used as emulsifiers and stabilizers in the preparation of resin emulsions which form water-insensitive films. Copolymers of polyoxyethylene compounds and polymerizable monomers have hitherto been prepared in the absence of appreciable amounts of water, and previous attempts to prepare them in aqueous medium have been unsuccessful.

It has now been found that water-soluble copolymers of polyethylene glycols and copolymerizable monomers can be prepared directly in aqueous medium, in the presence of suitable catalysts. Furthermore, by using excess monomer, it has now been found possible to prepare stable aqueous resin emulsions with the simultaneous formation of the emulsifying agent in situ. The polyethylene glycols, as hereinafter referred to, are polyoxyethylene compounds having at least four oxyethylene units in their structure.

The invention therefore consists in a process for the preparation of a copolymer of (A) a polyethylene glycol, and (B) a monomeric liquid copolymerizable with the polyethylene glycol, said liquid being selected from the group consisting of (a) vinyl esters of alkanoic acids having four to ten carbon atoms in the ester, (b) alkyl esters of acrylic and methacrylic acids having one to eight carbon atoms in the alkyl radical and (c) mixtures of the said vinyl and alkyl esters, which process comprises (1) agitating at polymerization temperatures in the range between 20° C. and reflux temperature a system comprising (i) water, (ii) the polyethylene glycol, (iii) the copolymerizable liquid, and (iv) a water-soluble polymerization catalyst for the copolymerizable liquid, and (2) continuing the agitation at polymerization temperature until polymerization is substantially complete.

Optimum proportions of copolymerizable monomeric liquid and polyethylene glycol for the formation of just the water soluble surface active copolymer in aqueous medium are in the range of one molecule of monomer to between about 20 and 40 ethylene oxide units of the glycol. With higher proportions of copolymerizable monomer than the foregoing, the homopolymer of the monomeric liquid also tends to form. This range of optimum proportions for formation of the copolymer alone in aqueous medium corresponds to molar ratios of polymerizable monomer to ethylene oxide units of 0.05 to 0.025. Effective surface active copolymer is obtained however, with ratios as low as 0.005.

The invention further consists in the process as aforesaid wherein there is used an amount of monomeric liquid in excess of that utilized in the formation of surface active copolymer, whereby the copolymer of polyethylene glycol and monomer is formed and acts as an emulsifying and stabilizing agent for the in situ emulsion polymerization of the excess monomeric liquid, thereby forming a stable aqueous resin emulsion of the polymer of the monomeric liquid.

The invention further consists in a process as described above, wherein the molar ratio of polymerizable liquid to ethylene oxide units lies between 1.5 and 20, preferably between 4 and 10; these ratios ensure that a copolymer of the polyethylene glycol and part of said liquid is produced and that simultaneously a polymer of the remainder of said liquid is produced in the form of an aqueous resin emulsion stabilized by said copolymer.

The proportion of water in which the process of the reaction is carried out does not appear to be critical. Obviously if a concentrated aqueous solution of copolymer were wanted, it would advantageously be prepared by making the copolymer under anhydrous conditions, for example by the process described in the copending application of Leo M. Germain, Ser. No. 706,901, filed January 3, 1958, then dissolving the anhydrous product in the minimum amount of water required to give the desired concentration of solution. The present invention is advantageous for the preparation of the copolymer in dilute aqueous solutions, such as for example the aqueous medium which forms the aqueous phase of an aqueous resin emulsion. For these purposes, the proportion of water can be up to, for example, one hundred times the amount of copolymer by weight.

When a polyethylene glycol and a polymerizable monomeric liquid suitable for the processes of this invention are stirred together in water in the absence of a polymerization catalyst, the surface tension of the mixture remains substantially unchanged. However, when an effective water-soluble polymerization catalyst is added to the mixture at a temperature suitable to bring about a polymerization reaction, the surface tension of the resulting mixture is lowered to a marked extent, thereby indicating that a surface active material has been formed as a result of a polymerization or copolymerization reaction. Simple mixtures of the polyethylene glycol and separately prepared polymer of the monomer do not exhibit and similar reduction in surface tension, showing that the lowering in surface tension is due to the combination of polyethylene glycol with the polymerized liquid in a copolymer arrangement.

When a polyethylene glycol and an excess of a polymerizable monomer suitable for the processes of this invention are agitated together in water in the absence of an added surface-active material, emulsification occurs only after a water-soluble polymerization catalyst is added. This shows clearly the formation of the emulsification agent in situ. The copolymer of polyethylene glycol is a distinct species which is separable by solution chromatography from the polymer derived solely from the monomer. The proportion of polymerized monomer in these copolymers of polyethylene glycol can be determined by standard analytical procedures.

The formation in situ of a copolymer of polyethylene glycol and polymerizable liquid as an emulsifier simultaneously with the formation of a resin emulsion is obviously economically advantageous, because the elimination of the preparation of emulsifier as a separate step results in a cost reduction. Additionally, the similarity of the compositions of the emulsifier and resin renders them exceptionally compatible, hence dried films cast from the emulsions have exceptional clarity.

Examples of suitable water-soluble catalysts for promoting the copolymerization of polyethylene glycols and copolymerizable liquids in aqueous medium are the water-soluble free-radical catalysts such as potassium persulfate, sodium persulfate, and ammonium persulfate. Reduction-activated catalyst systems such as alkali metal persulfate and sodium formaldehyde sulfoxylate are also effective in promoting the copolymerization reaction in aqueous medium to form surface active materials. Water-soluble free-radical catalysts and reduction-activated catalyst systems are also effective in promoting the simultaneous formation in aqueous medium of an emulsifying agent from a polyethylene glycol and a polymerizable liquid and of an emulsion of the polymerized liquid, when said liquid is present in excess. The proportion of polymerization catalyst is not critical; conveniently it is used in a proportion of less than 1% by weight of the monomer to be polymerized, as in conventional emulsion polymerizations, but much larger proportions, for example up to ten percent, can be used.

In the preparation in aqueous media of water-soluble copolymers of polyethylene glycols and polymerizable monomers, the total quantity of the polyethylene glycol can be dissolved in water in the reaction vessel before the copolymerization reaction begins, or optionally, only a portion may be included in the initial reaction charge and the remainder added gradually as an aqueous solution during the course of the copolymerization. Similarly, the monomer to be reacted with the polyethylene glycol can be added in toto before copolymerization is initiated, or optionally, a portion may be added at the beginning and the remainder added gradually during the copolymerization reaction. Likewise the catalyst solution can be added in a manner most conducive to the desired results; with catalyst systems consisting of two or more components, one or all of such components can similarly be added either at the beginning or gradually during the polymerization reaction.

Likewise, in the preparation of stable resin emulsions stabilized by these water-soluble copolymers made in situ, emulsion polymerization procedures well-known in the art can be modified and adapted. As before, the total quantity of the polyethylene glycol can be dissolved in water in the reaction vessel before the copolymerization reaction begins, or optionally, only a portion may be included in the initial reaction charge and the remainder added gradually as an aqueous solution during the course of the copolymerization. Similarly, the liquid to be polymerized can be added in to to before polymerization is initiated, or optionally, a portion may be added at the beginning and the remainder added at a rate to be determined by some variable, such as the temperature of the reaction or the rate of reflux of unreacted monomer. Likewise the catalyst solution can be added in a manner most conducive to the desired results; with catalyst systems consisting of two or more components, one or all of such components can similarly be added either at the beginning or gradually during the polymerization reaction. It is sometimes advisable to utilize a minor amount of an additional material in the form of a wetting agent which assists in the initial emulsification of liquid monomer in aqueous medium.

The temperatures at which the polymerization and copolymerization reactions are carried out are preferably between 20° C. and the refluxing temperatures of the reacting mixtures.

When the polymerization reaction is substantially complete, it is generally desirable to remove the small quantities or traces of unreacted monomer which remain in the reaction mixture, especially when the presence of such monomer might have an adverse effect on the properties of films prepared from the emulsions of this invention. Such unreacted monomer may be removed by any of the conventional methods, such as by blowing with air, distillation, or addition of active catalyst systems.

Films formed from resin emulsions containing the water-soluble polyethylene glycol-polymerizable liquid copolymers as emulsifying agents formed in situ are clear and exhibit unexpectedly good water-resistance and scrub resistance. These resin emulsions are useful in paint and coating formulations, and as adhesives.

The following examples illustrate the invention which is defined by the claims. The polyethylene glycol used in the examples was "Carbowax," the registered trademark for such glycols sold by Union Carbide Chemicals Company. A number (e.g. 4000, and 20M, meaning 20,000) following the trademark indicates the approximate average molecular weight of the particular polyethylene glycol. Polyethylene glycols ranging in molecular weight from about 200 to 20,000 are preferable for use in this invention. Such glycols have at least four oxyethylene units in their structure.

EXAMPLE 1

In this example, approximately equal weights of vinyl acetate and Carbowax 4000 were reacted in water in the presence of a reduction activated catalyst.

Potassium persulfate (0.5 gram) and sodium formaldehyde sulfoxylate (0.3 gram) were dissolved in water (300 ml.) and stirred at room temperature while a solution of Carbowax 4000 (50 grams) in water (100 ml.) and vinyl acetate (50 ml.) were added separately at proportional rates over a period of 1.5 hours. The liquid turned milky after one hour, and after stirring overnight a bluish emulsion was obtained. This was stripped of monomer by air blowing at 60° C. and water was added to restore the volume to the original level. The surface tension of the emulsion product at 30° C. was 51.8 dynes per cm.

The emulsion was heated to drive off the water, leaving a liquid phase and a colorless solid material at 110° after the water had evaporated. The liquid product was separated and was found to be completely water soluble. The surface tension of a 1% solution of the liquid at 30° was found to be 51 dynes/cm., compared to 65 dynes/cm. for a 1% solution of Carbowax 4000 in water at 30°. The vinyl acetate content of the liquid was 2.5% as determined by saponification, and the liquid was thus identified as a copolymer of vinyl acetate and Carbowax. The solid material from the evaporated emulsion was extracted with 100 ml. water to remove occluded water-soluble liquids; the residual insoluble portion was shown by analysis after drying to be polyvinyl acetate (14 grams).

EXAMPLE 2

In this example, potassium persulfate was the sole catalyst and approximately equal weights of Carbowax and vinyl acetate were reacted. The water-soluble portion of the emulsion product was subjected to chromatographic analysis.

Carbowax 4000 (15 grams) was dissolved in water (343 ml.) and heated to 60° C. with stirring. Potassium persulfate (0.8 gram) and vinyl acetate (4 ml.) were added and the temperature was raised slowly to 82° C. Additional vinyl acetate (11 ml.) was added while the temperature was being raised from 70° to 82° C. The temperature was maintained at 82° C. for 10 minutes, and was then increased to 90° C. before cooling. The product was an emulsion.

The emulsion was dried by evaporation of the water and the residue extracted with water (200 ml.) at 60°. The water-soluble extract when dried was a brownish solid. The surface tension of a 1% solution of the water-soluble extract was 47.2 dynes/cm. while that of 1% Carbowax 4000 solution was 65 dynes/cm., both at 30°. The combined vinyl acetate content of the water-soluble extract was 8.8%, as determined by saponification.

A sample of the water-soluble extract was dissolved in benzene and adsorbed on a 5.5-inch column of alumina (25 grams). The column was eluted with two 50 ml. portions of benzene, followed by six 50 ml. portions of benzene containing 2% methanol and then by 100 ml. methanol. The water-soluble extract was found to consist almost entirely of a surface active vinyl acetate- Carbowax compound containing 4 to 7% vinyl acetate by weight, or 1.6 to 3 moles vinyl acetate monomer to 1 mole Carbowax 4000 (average molecular weight 3350). All the fractions had a surface-tension depressant effect similar in magnitude to that noted above in this example.

EXAMPLE 3

This series of experiments (a) to (d) was carried out to demonstrate that vinyl acetate and polyethylene glycol can combine in the presence of a suitable catalyst to give a surfactant in aqueous media.

Potassium persulfate catalyst and Carbowax were dissolved in water (quantities shown in Table I), heated to 60° C. and maintained at this temperature for one hour, after which the vinyl acetate was added slowly. The proportions were so chosen that the vinyl acetate was almost completely soluble in the water. The surface tensions of the products are shown in Table I. The surface tension of a 5% solution of Carbowax 4000 was 63.5 dynes/cm. at 30° C. In another experiment identical with (c) below except that no catalyst was used, the surface tension remained close to this value of 63.5 dynes/cm., indicating that no surfactant was formed. In the four experiments in Table I, which employed the persulfate catalyst, the surface tension of 5% solutions of the products at 30° C. was markedly lower than this value, indicating that a surface active material was formed.

*Table I*

| Number | Water, ml. | Carbowax 4000, grams | Vinyl Acetate, grams | Potassium Persulfate, grams | Reaction Temp., °C. | Surface Tension of Product at 30° C., dynes/cm. |
|---|---|---|---|---|---|---|
| (a) | 300 | 15 | 10 | 0.1 | 70 | 43.9 |
| (b) | 300 | 15 | 8.4 | 0.5 | 80 | 45 |
| (c) | 300 | 15 | 5.1 | 0.5 | 75 | 43.4 |
| (d) | 300 | 15 | 14 | 0.5 | 75 | 42.0 |

EXAMPLE 4

In order to confirm that the surface tension effects obtained in the previous examples could not be explained as the effects of small amounts of low molecular weight polyvinyl acetate dissolved in aqueous Carbowax solutions, the following two solubility experiments were carried out. Gelva 2.5 (a commercial grade of polyvinyl acetate) was the low molecular weight resin used. The "2.5" indicates the viscosity in centipoises of a solution of 86 grams of resin made up to one liter with benzene and measured at 20° C.

(a) Carbowax 4000 (125 grams) was dissolved in distilled water (500 ml.) and the surface tension of the solution measured at 30° C. and found to be 54.0 dynes/cm. Gelva 2.5 (2 grams) was added to the stirred solution at 60°. The temperature was then raised to 90° C. and maintained at that point for 3 hours. On cooling, a slightly turbid solution was obtained, and the volume was corrected to the original value. The surface tension was found to be 55 dynes/cm. at 30° C.

(b) Carbowax 4000 (125 grams) and Gelva 2.5 (2.0 grams) were dissolved in methanol (350 ml.). The solution was added, with vigorous stirring, to water (500 ml.) maintained at 70° C. The mixture was then evaporated to a volume of 250 ml. and the volume corrected to 500 ml. with distilled water. A turbid solution was thus obtained. The polyvinyl acetate content of the solution was found to be 0.02%, and the surface tension at 30° was 53.5 dynes/cm.

Aqueous solutions of Carbowax containing dissolved polyvinyl acetate thus exhibit no significant surface tension depressing effects as a result of the dissolved polyvinyl acetate. Furthermore, the solubility of polyvinyl acetate in aqueous Carbowax solutions is very low, under the most favorable conditions. The surface tension depressing effects of the products of Examples 1 to 3 are thus obviously not due to simple mixtures of Carbowax and polyvinyl acetate.

EXAMPLE 5

In this example, an emulsifying agent was formed in situ during emulsion polymerization of vinyl acetate. A portion of the vinyl acetate evidently reacted with Carbowax to form a surface active agent.

(1) Water _____ 343.0 ml.
(2) Santomerse S (30%) _____ 7.0 ml.
(3) Carbowax 4000 _____ 27.25 grams.
(4) Sodium bicarbonate _____ 1.0 gram.
(5) Potassium persulfate (initial) _____ 0.8 gram.
(6) Vinyl acetate (initial) _____ 4.0 ml.
(7) Vinyl acetate (delayed) _____ 421.0 ml.
(8) Potassium persulfate (delayed) ____ 0.3 gram.
(9) Potassium persulfate (terminal) ____ 0.15 gram in 4 ml. $H_2O$.

Santomerse S is a commercial alkyl aryl sodium sulfonate wetting agent supplied by Monsanto Chemical Co.

The first six ingredients listed above were stirred together at 240 r.p.m. and heated to 60° C. Addition of delayed vinyl acetate was then begun and heating was continued to maintain the reaction temperature at 80–84° C. The rate of addition of vinyl acetate was controlled so as to eliminate any reflux. Delayed catalyst was added in small portions at intervals when the reaction showed a tendency to diminish. Terminal catalyst was added after completion of the delayed addition of vinyl acetate, while the temperature was raised to 90° C. Total reaction time was 6.75 hours.

The resulting stable emulsion had a solids content of 52% and residual monomer content of 0.8%. Particle size was 0.2 to 0.8 micron. Films from the emulsion were glass-clear and flexible and had good water-spotting resistance.

In similar experiments, the procedure was varied by mixing together only items 1 to 4 and 6, while the catalyst (item No. 5) was added subsequently. It was found that emulsification of the monomer did not occur until the catalyst had been added and the reaction begun. This indicated that the emulsifier was being formed in situ.

EXAMPLE 6

Example 5 was repeated, using 15 grams of Carbowax 4000 instead of the 27.25 grams of Example 5, and 0.4 gram delayed catalyst instead of the 0.3 gram of Example 5. The other ingredients were the same as in Example 5. The procedure was the same except that the total reaction time was 9 hours instead of the 6.75 hours of Example 5. The solids content of the resulting emulsion was 51.2%, residual monomer 0.9%, and the particle size 0.2 to 0.5 micron. Films from the emulsion were glass-clear and flexible, and had excellent water-spotting resistance.

When the procedure of Example 6 was varied by employing a reduction-activated catalyst (potassium persulfate with sodium formaldehyde sulfoxylate), an emulsion of 46% solids and an average particle size of 0.1 micron was obtained. Films of the dried emulsion were clear and water-resistant.

EXAMPLE 7

A stable polyvinyl acetate emulsion was prepared in which the Carbowax-polyvinyl acetate compound as prepared in situ was the only surface active agent present, with the following ingredients:

(1) Water _____ 343.0 ml.
(2) Carbowax 200 _____ 15.0 grams.
(3) Potassium persulfate _____ 1.5 grams.
(4) Vinyl acetate (initial) _____ 10.0 ml.
(5) Vinyl acetate (delayed) _____ 250.0 ml.
(6) Potassium persulfate (delayed) ____ 0.5 gram in 20 ml. $H_2O$.
(7) Potassium persulfate (terminal) ____ 0.2 gram.

The first three ingredients were stirred together and heated to 60° C. The initial vinyl acetate was added over a period of 10 minutes, and when the temperature reached 70°, the addition of delayed vinyl acetate was begun. The reaction temperature was increased to 80° C., and the addition of delayed monomer and catalyst was completed in about 5 hours. Terminal catalyst was then added, and the temperature increased to 90° C. before cooling. There was a small quantity of resin adhering to the stirrer at the end of the run.

The resulting stable emulsion contained 36% solids and had an average particle size between 0.6 and 0.7 micron. It formed clear films with good water-spotting resistance.

EXAMPLE 8

A stable polymethyl methacrylate emulsion was prepared in which the emulsifying agent was formed in situ, using the following ingredients:

(1) Water _____ ml__ 270
(2) Carbowax 4000 _____ grams__ 30
(3) Methyl methacrylate (initial) _____ ml__ 60
(4) Sodium formaldehyde sulfoxylate _____ grams__ 0.3
(5) Potassium persulfate _____ do____ 0.8
(6) Water _____ ml__ 30
(7) Methyl methacrylate (delayed) _____ ml__ 150

The inhibitor was removed from the monomer by washing with an alkaline solution. The first four ingredients and 5 ml. of the persulfate solution (items 5 and 6) were stirred at 40° C. in a one-litre kettle. Delayed addition of items 5, 6 and 7 was started slowly. After 10 minutes, the liquid became white, indicating that emulsification of the monomer was taking place. The addition of delayed methyl methacrylate was completed in 85 minutes. The temperature was raised from 39° C. to 55° C. by heating. A total of 0.5 gram persulfate and 0.3 gram sulfoxylate were added at intervals during the run. With addition of the remaining persulfate solution, the temperature rose from 67° C. to 85° C., after which the product was cooled.

The product was a stable emulsion of polymethyl methacrylate with 43% solids and a particle size of 0.2–0.3 micron. The water-resistance of dried films cast from the emulsion was excellent.

EXAMPLE 9

A stable polymethyl acrylate emulsion was prepared in the absence of any stabilizer other than that formed in situ, using the following ingredients:

(1) Water _____ 270 ml.
(2) Carbowax 4000 _____ 30 grams.
(3) Potassium persulfate _____ 0.8 gram in 30 ml. H$_2$O.
(4) Methyl acrylate (initial) _____ 60.0 ml.
(5) Sodium formaldehyde sulfoxylate ____ 0.3 gram.
(6) FeSO$_4$ (catalyst activator) _____ 0.1 gram.
(7) Methyl acrylate (delayed) _____ 150.0 ml.

The Carbowax was dissolved in the water, the initial monomer added, and 10 ml. of potassium persulfate solution was added along with 0.2 gram sodium formaldehyde sulfoxylate and stirred at 35° C. On addition of 0.1 gram ferrous sulfate, the temperature rose to 52° C. The addition of delayed monomer was carried out in 24 minutes, at the end of which time the final temperature was 63° C. The remaining 8 ml. of potassium persulfate solution together with 0.1 gram sulfoxylate were added, and resulted in a temperature rise to 80° C. The product was then cooled.

The resulting stable polymethyl acrylate emulsion had a solids content of 40.6%, and a particle size from 0.2 to 0.5 micron. Dried films formed from the emulsion were flexible and glass-clear, and had good water-spotting resistance.

It will be readily understood by those skilled in the art that numerous modifications may be made in the preceding examples without departing from the essence of the invention as defined in the following claims.

I claim:

1. A process for the preparation of a copolymer of (A) a polyethylene glycol, and (B) a monomeric liquid copolymerizable with the polyethylene glycol, said liquid being selected from the group consisting of (a) vinyl esters of alkanoic acids having four to ten carbon atoms in the ester, (b) alkyl esters of acrylic and methacrylic acids having one to eight carbon atoms in the alkyl radical, and (c) mixtures of the said vinyl and alkyl esters, which process comprises (1) agitating at polymerization temperature in the range between 20° C. and reflux temperature a system consisting essentially of: (i) water, (ii) the polyethylene glycol, (iii) the copolymerizable liquid, and (iv) a water-soluble polymerization catalyst for the copolymerizable liquid of the group consisting of water-soluble free radical catalysts and water-soluble reduction-activated catalyst systems, and (2) continuing the agitation at polymerization temperature until polymerization is substantially complete.

2. A process as claimed in claim 1, wherein the polyethylene glycol has an average molecular weight in the range from 200 to 20,000.

3. A process as claimed in claim 2, wherein the molar ratio of polymerizable liquid to ethylene oxide units of the polyethylene glycol lies between 0.05 and 0.005.

4. A process as claimed in claim 3, wherein the molar ratio of polymerizable liquid to ethylene oxide units lies between 0.05 and 0.025.

5. A process as claimed in claim 4, wherein the polymerizable liquid is vinyl acetate.

6. A process as claimed in claim 2, wherein the molar ratio of polymerizable liquid to ethylene oxide units lies between 1.5 and 20, whereby a copolymer of the polyethylene glycol and the polymerizable liquid is produced and simultaneously a polymer of the polymerizable liquid is produced as an emulsion stabilized by the copolymer.

7. A process as claimed in claim 6, wherein the polymerizable liquid is vinyl acetate.

8. A process as claimed in claim 1, wherein the molar ratio of polymerizable liquid to ethylene oxide units lies between 1.5 and 20 whereby a copolymer of the polyethylene glycol and the polymerizable liquid is produced and simultaneously a polymer of the polymerizable liquid is produced as an emulsion stabilized by the copolymer.

9. A process as claimed in claim 2, in which the copolymerizable liquid is methyl acrylate.

References Cited in the file of this patent

UNITED STATES PATENTS

| | | |
|---|---|---|
| 2,211,266 | Gibello | Aug. 13, 1940 |
| 2,852,565 | Nozaki | Sept. 16, 1958 |
| 2,957,843 | Anderson et al. | Oct. 25, 1960 |

FOREIGN PATENTS

| | | |
|---|---|---|
| 499,577 | Canada | Jan. 26, 1954 |

UNITED STATES PATENT OFFICE
CERTIFICATE OF CORRECTION

Patent No. 3,058,940                      October 16, 1962

Richard W. Rees

It is hereby certified that error appears in the above numbered patent requiring correction and that the said Letters Patent should read as corrected below.

Column 4, line 21, for "solu-" read -- solution --.

Signed and sealed this 23rd day of April 1963.

(SEAL)
Attest:

ERNEST W. SWIDER                      DAVID L. LADD
Attesting Officer                       Commissioner of Patents